United States Patent [19]
Nakata et al.

[11] Patent Number: 5,854,841
[45] Date of Patent: Dec. 29, 1998

[54] COMMUNICATION SYSTEM

[75] Inventors: Yukio Nakata; Susumu Matsui, both of Machida; Yasuhiro Takahashi, Sagamihara; Takeshi Kondou, Fujisawa; Yutaka Otsu, Ebina, all of Japan

[73] Assignee: Hitachi, Ltd., Tokyo, Japan

[21] Appl. No.: 755,594

[22] Filed: Nov. 25, 1996

[30] Foreign Application Priority Data

Nov. 24, 1995 [JP] Japan ................................. 7-305503

[51] Int. Cl.⁶ ....................................................... H04L 9/00
[52] U.S. Cl. .................................. 380/49; 380/9; 380/28; 380/59
[58] Field of Search .................................... 380/9, 28, 49, 380/50, 59, 4; 333/14; 345/202; 364/715.02; 370/202, 521; 381/106; 382/166, 232, 233; 395/612, 114, 2.91, 2.94, 888; 455/72

[56] References Cited

U.S. PATENT DOCUMENTS 5,479,512  12/1995  Weiss ........................................ 380/28

OTHER PUBLICATIONS

"The SSL Protocol" version 3.0, Netscape Communications Corporation Mar. 4, 1996 pp. 1–55.

*Primary Examiner*—Bernarr Earl Gregory
*Attorney, Agent, or Firm*—Antonelli, Terry, Stout & Kraus, LLP

[57] ABSTRACT

Data is compressed/encrypted for communication between application programs without addition of any modification to the application programs. In a communication system where a plurality of personal computers are connected to each other using communication lines, a personal computer is provided with a communication program and an application program, the application program uses a command offered by the communication program for transmission and reception of data with another personal computer, a hooking program for discriminating the command related to the data communication issued by the application program is provided and, after the hooking program has compressed or encrypted the data of application program depending on a type of the command, the command is transferred to the communication program.

15 Claims, 13 Drawing Sheets

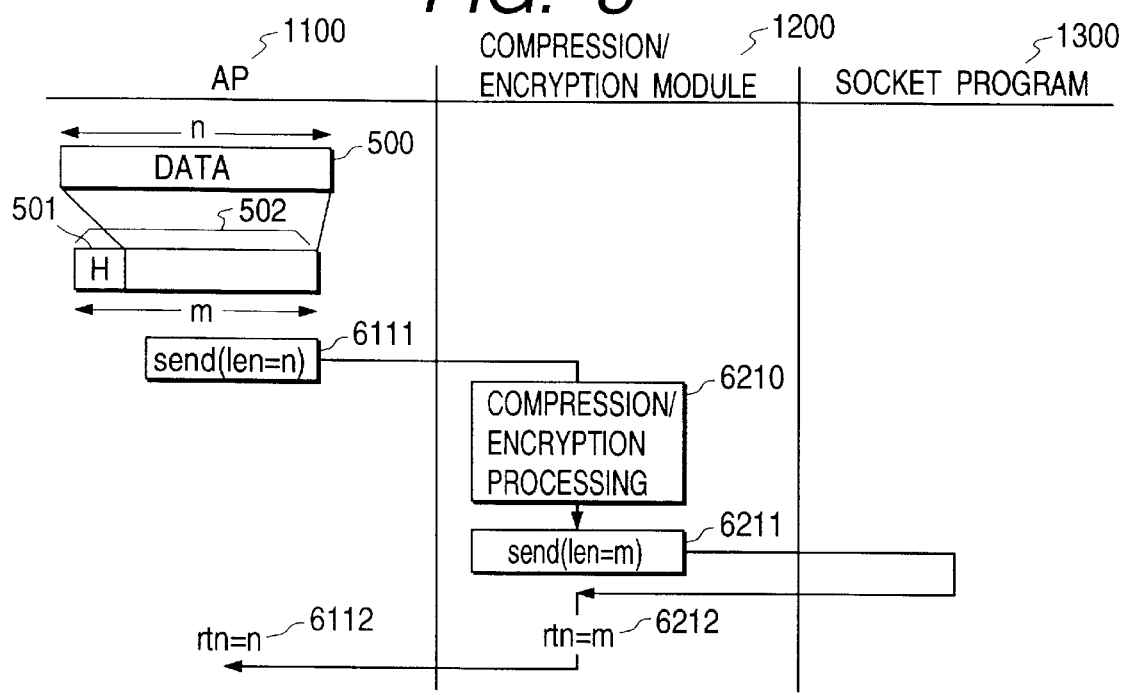
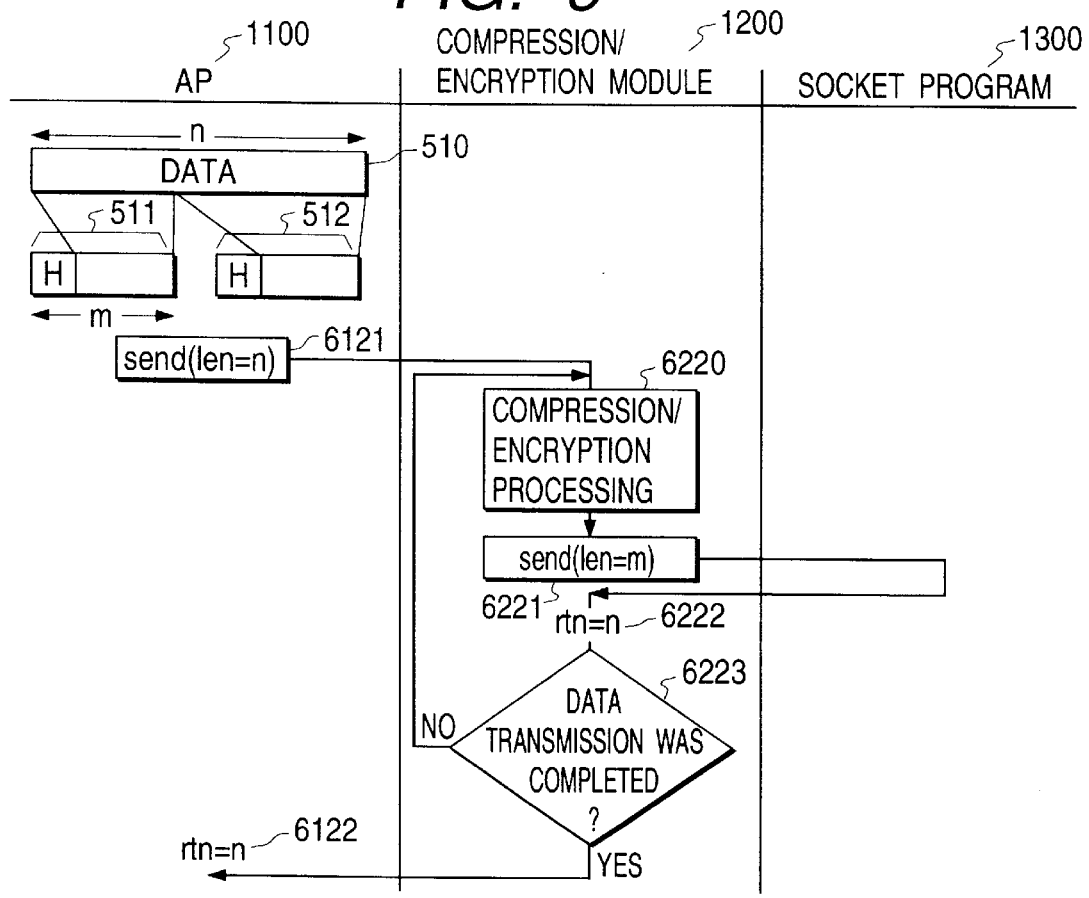

COMMUNICATION SYSTEM

BACKGROUND OF THE INVENTION

The present invention relates to a communication system in which a plurality of information processors, such as personal computers, are connected through a LAN, public communication network and radio communication system, and, more particularly, to a communication system for realizing communication through compression/encryption of data between application programs.

The use of a client server system is now becoming more widespread. In a client server system, a plurality of server personal computers (hereinafter referred to as PCs) are connected with a plurality of client PCs through a communication means, and thereby a client PC can designate a server PC to receive the services offered therefrom. At the present time, a communication means utilizing a wide area network and radio communication system is being employed in increasing numbers. Moreover, as a profile of services, the transfer of credit card numbers for purchasing items and the transmission/reception of confidential company information are also increasing.

In such cases, wiretapping or illegal use of data by a third party will result in a large loss for companies. Meanwhile, since the communication rate is rather low in a wide area network or radio communication system, compressed data must be transmitted.

On the other hand, a standardized communication means has been provided for the application programs to be used for the client server system communication. For example, a socket interface used in the field of INTERNET communication is very famous. The socket interface provides a standardized interface and also has an object to ensure that any type of protocol used for communication or communication hardware may be applied to application programs. The socket interface currently is in wide use for large scale computers to work stations or personal computers, and a countless number of application programs are operated using such a socket interface. However, since the socket interface itself does not have the function of data compression/encryption, an alternative means must be provided for communication of data through compression/encryption. As an example, the SSL (Secure Sockets Layer) protocol developed by NetScape Inc.(U.S.A.) is a protocol for transmitting encrypted data in the upper layer of the socket interface. In this case, the data which has been encrypted previously on the application program side is transferred to the socket interface. SSL can offer the data encrypting function for any type of application program, but requires some modifications of the application program itself. Namely, the modification required is that SSL prepares for commands in place of issuing existing socket interface commands.

Meanwhile, there is an encrypted communication protocol characterized for the application programs. For example, S-HTTP (Secure-HyperText Transfer Protocol), which is the Internet standard version, has been established by introducing the encrypting function into the communication protocol HTTP used for a discrete hypermedium WWW (Word Wide Web).

In addition, as a method for compressing/encrypting data, there is a communication adapter or a means for compressing/encrypting data in the driver program for controlling a communication adapter. For instance, the international standard specification v42.bis has been proposed to compress the data in the communication modem. Moreover, PPP (Point-to-Point Protocol) is an example of a driver program of a communication adapter for compressing/encrypting data.

For data compression/encryption with application programs to realize a client server system communication using the socket interface, there is a problem in that it is difficult for a countless number of application programs already used to utilize the compressing/encrypting function because the existing system, for example, SSL, requires modifications to use a large number of exclusive commands for SSL by modifying the application programs. In addition, there is another problem in that the encrypting protocol developed for the particular applications, such as S-HTTP, can not naturally be used for other application programs.

Moreover, when an application program has intermittent transmission because of a failure of the communication line during transfer of compressed/encrypted data or heavy traffic on the communication line in such a communication system that data compression/encryption is respectively performed using conversion tables on both the transmitting and receiving sides, a problem arises in that mismatching is generated between the two conversion tables, disabling subsequent normal compression/encryption because the data is updated only up to an intermediate part thereof on the receiving side, although the compressed/encrypted data is perfectly updated depending on the conversion table on the transmitting side.

Further, on the occasion of effecting communication by compressing/encrypting data between the client and server, connections must individually be set between the client and gateway and between the gateway and server in case a gateway exists in the course of the communication line to first return the data to the initial format on the gateway through the decryption/decompression of data for the purpose of repeated compression/encryption.

SUMMARY OF THE INVENTION

It is therefore an object of the present invention to provide a communication system which can transmit and receive compressed/encrypted data using a socket interface without modification of the existing application programs.

Additionally, it is an object of the present invention to provide a compressing/encrypting communication system which enables communication of compressed/encrypted data regardless of the type of communication hardware being employed.

It is another object of the present invention to provide a compressing/encrypting communication system for matching the transfer data on the transmitting and receiving sides even when the application program experiences an intermittent transfer of the compressed/encrypted data.

It is a further object of the present invention to provide a compressing/encrypting communication system which enables communication of compressed/encrypted data between a client and a server effecting communication through a gateway.

In order to achieve the objects explained above, in the communication system where a plurality of personal computers are connected with each other through a communication line, a personal computer is provided with a communication module and application programs, and an application program transmits data to or receives data from another personal computer using commands offered from the communication module, a program for hooking the commands is prepared and the application program data is compressed/encrypted. Moreover, negotiation is performed for the algorithm to be used through compression/encryption at the time of starting the communication.

Moreover, the hooking program transmits data incorporated to a data transmission command through compression and encryption in a unit of the frame in a certain length and, when transmission of the frame is interrupted, returns a message indicating completion of transmission of the frame as a response of the data transmission command to continue the transmission of the frames not yet transmitted.

When the compressed/encrypted programs are located only in the one personal computer initiating the communication, communication is carried out without data compression/encryption. Moreover, when the personal computer of a distant communicating party is not provided with the function for compression/encryption of data, a user is requested to confirm the start of communication.

In addition, on the occasion of effecting communication between a first personal computer and a second personal computer via a gateway, after a first connection is set, using the hooking program on the gateway, between the hooking program of the first personal computer and the hooking program of the gateway, information indicating the address of the second personal computer and the connecting point is transmitted to the hooking program of the gateway from the hooking program of the first personal computer, and the hooking program sets a second connection at the connecting point of the second personal computer based on such information. Thereby, communication can be realized between the first personal computer and second personal computer using the two connections explained above.

With such a structure, the control of commands for data communication issued by the application program is transferred to the self-generated compression/encryption program in place of the socket interface program and after the compressing/encrypting process for the application program data, control is transferred to the socket interface program. Otherwise, the data received from the socket interface program is decompressed/decrypted before it is transferred to the application program. Thereby, communication can be realized through data compression/encryption without changing the application programs.

Moreover, the compression/encryption program is capable of having a plurality of compression algorithms and a plurality of encryption algorithms, and the common algorithm can be determined and communication can be realized using such algorithm by presenting the algorithm used between its own compression/encryption program and that of the distant party when the communication connection is set up.

In addition, in a case where the personal computer of a distant communicating party does not load the compression/encryption program, it is detected that the negotiation has not succeeded in connection with the data compression/encryption process, and thereby communication can be realized even when the compression/encryption program is not operated only on the single side.

Furthermore, in a case where the personal computer of a distant communicating party does not load the compression/encryption program, it is detected that the negotiation has not succeeded and an indication that the distant party does not have the compressing/encrypting function is displayed on the display screen of the personal computer with an inquiry as to whether to start the communication or not. When a user sends the answer YES, the communication can be started.

According to the present invention, since the compression/encryption process is performed in a unit of a frame and the frame is guaranteed to be transmitted completely by the compressing/encrypting module, there is no possibility that the conversion tables for the compression/encryption will be mismatched the transmitting side and receiving side resulting in data compression/encryption being disabled.

According to the present invention, even when communication is carried out between a first personal computer and a second personal computer via a gateway, since the hooking program provided at the gateway relays the connection between the first personal computer and the second personal computer, the packet data compressed/encrypted in the first personal computer can be sent directly to the server without decryption/decompression, and thereby efficient communication utilizing compression/encryption may be realized between the client and the server.

BRIEF DESCRIPTION OF THE DRAWINGS

Other objects and advantages of the present invention will be apparent from the following detailed description of the preferred embodiments thereof, which description should be considered in conjunction with the accompanying drawings in which:

FIG. 8 is a diagram showing an example (No. 1) of data transmission in the first embodiment;

FIG. 9 is a diagram showing an example (No. 2) of data transmission in the first embodiment;

DESCRIPTION OF THE PREFERRED EMBODIMENTS

Figure 1:
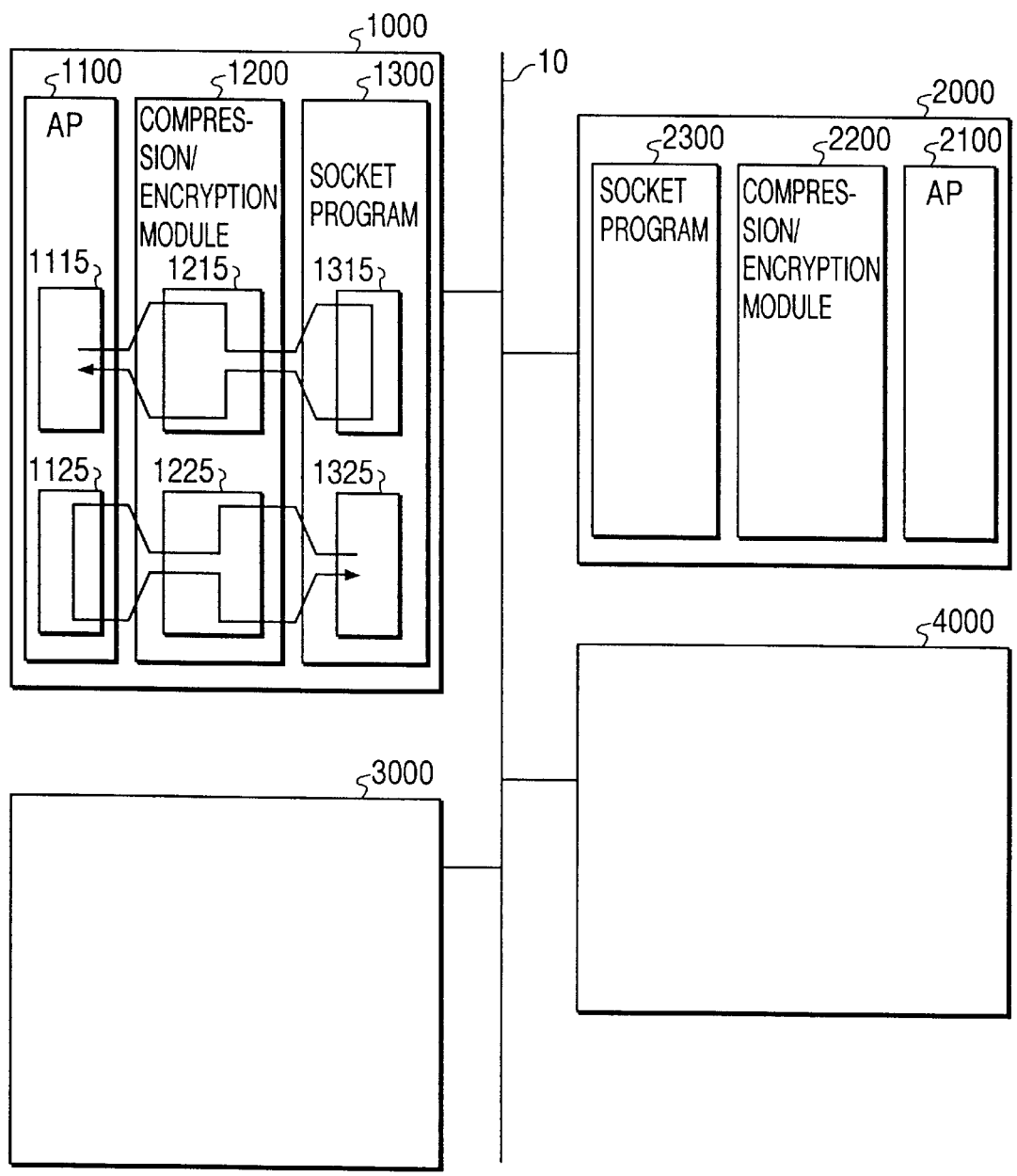
FIG. 1 is a block diagram showing the overall structure of a communication system as a first embodiment of the present invention.

The preferred embodiments of the present invention will be explained with reference to the accompanying drawings.

Like reference numerals are used to designate like elements throughout the drawings, and it is to be understood that the present invention is not limited to the embodiments explained below.

(EMBODIMENT 1)

Figure 2:
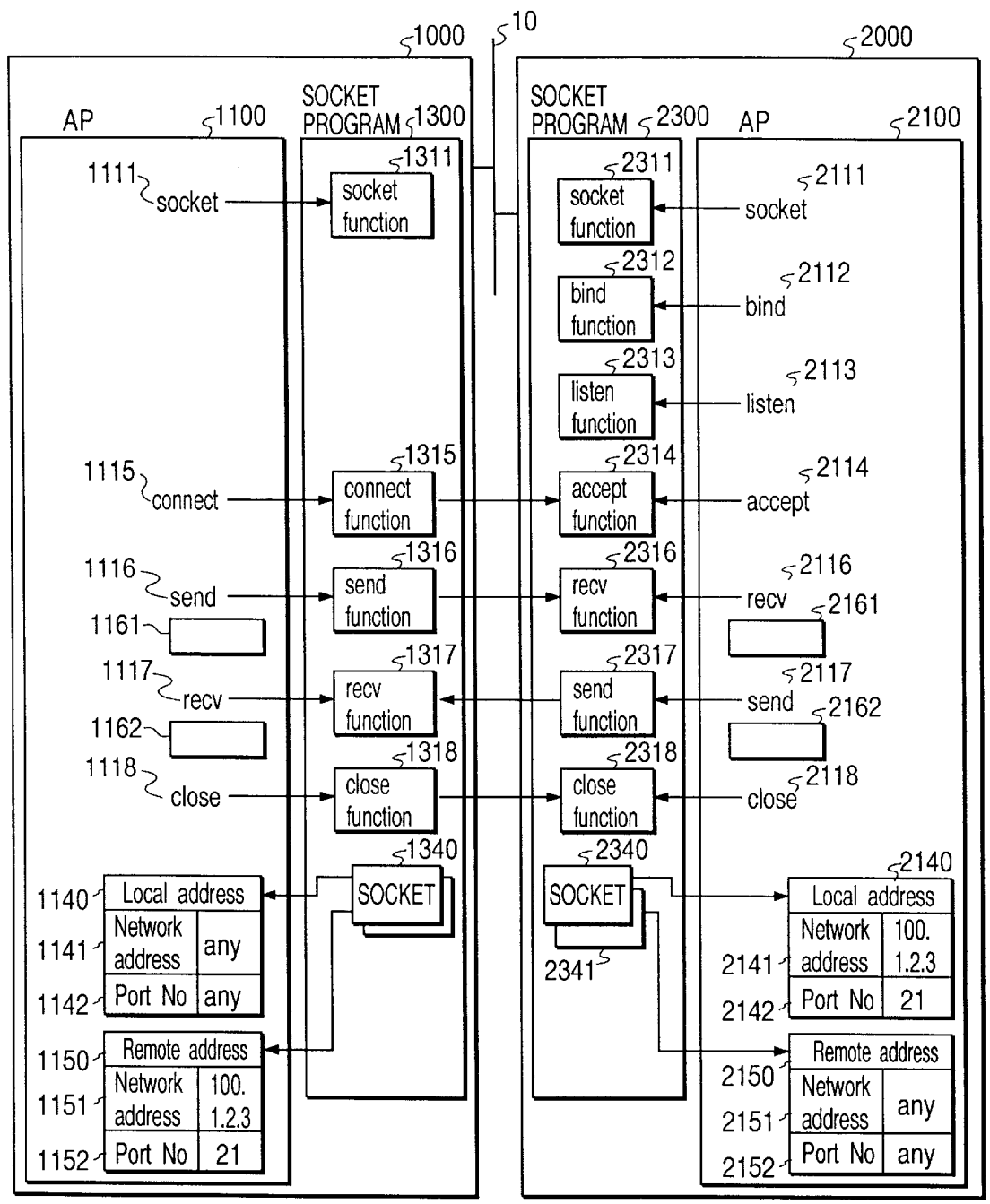
FIG. 2 is a diagram showing an existing communication method based on a socket program.

FIG. 2 is a diagram showing operation of an existing communication system. The reference numerals 1000 and 2000 designate personal computers which are connected via a communication medium 10. Within the personal computers, application programs (1100, 2100) and socket interface programs (hereinafter referred to only as a socket program) (1300, 2300) are provided. The application program 1100 executes certain processings by commanding the processing functions (1315 or the like) provided in the socket program 1300. Within the socket program 1300, a plurality of sockets 1340 are provided for setting a relationship between the application program and the socket program. The socket 1340 indicates a local address table 1140 and a remote address table 1150 provided within the application program and the application program is capable of executing a communication with a distant party through assignment of a socket from the socket program. The address table (1140, 1150) is provided with a respective entry for each network address (1141, 1151) and port number (1142, 1152). The network address is given for uniquely identifying the personal computer within the network, while the port number is given for identifying the application program within the personal computer. This explanation can also be applied to the personal computer 2000.

A profile of communication between the application programs 1100 and 2100 will be explained below. In this example, the application program 1100 corresponds to a client, while the application program 2100 corresponds to a server. Namely, the application program 1100 is the program operated by a user and the application program 2100 is the program for offering services, such as data base access to a user. A plurality of clients are connected to the server.

First, operations of the client application program 1100 will be explained. The client application program issues a socket command 1111. This command is transferred to the socket process 1311 of the socket program and the socket 1340 is assigned to the client application program. The application program causes the socket program to recognize the application program by designating this socket during execution of all subsequent socket interface functions. Next, the client application program issues a connect command 1115 using the remote address table 1150 of the server as an argument. The address 100.1.2.3 of the personal computer is previously set as the value to the network address entry 1151 of the remote address table 1150, while the number 21 indicating the server application program 2100 is set to the port number entry 1152. This command is transferred to the connect process 1315 and the connect process establishes correspondence between the socket 1340 and address table 1150 and also establishes a connection for the designated server in the address table. Here, the local address table 1140 is not used in this embodiment. Upon establishment of a connection, the client application program designates a buffer 1161 in which the transmitting data is stored to issue a send command 1116. The command transmits the data transferred to the send process 1316 to the server application program 2100. Next, the client application program designates the data receiving buffer 1162 to issue the recv command 1117. This command is transferred to the recv process 1317 to store the data received from the server application program 2100 to the receiving buffer 1162. Next, the client application program 1100 issues a close command 1118. This command is then transferred to the close process 1318 of the socket program to reset the assignment of the socket 1340 for the client application program.

Next, operations of the server application program 2100 will be explained. The server application program issues a socket command 2111. This command is transferred to the socket process 2311 to assign the socket 2340 to the server application program 2100. Next, the server application program designates a local address table 2140 to issue a bind command 2112. The address 100. 1. 2. 3 of the local personal computer 2000 is previously set as the value to the network address entry 2141 of the local address table 2140, while the value 21 is set to the port number entry 2142 as the number indicating itself, that is, the server application program 2100. The bind command is transferred to the bind process 2312 for establishing correspondence between the socket 2340 and local address table 2140. The remote address table 2150 is not used in this embodiment. Next, the server application program issues a listen command 2113. This command is processed by the listen process program 2313. The listen command indicates the maximum number of connections to be accepted by the server application program to the socket program. Next, the server application program issues an accept command 2114. This command is transferred to the accept process 2314. The accept process assigns a new socket 2341 having the same property as the socket 2340 to the server application program 2100 and also waits for a connection setting request from the other personal computer. Upon completion of the connecting setting, the accept command returns. Next, the server application program issues a recv command 2116 by designating a data receiving buffer 2161. This command is transferred to the recv process 2316 and thereby the data received from the client application program 1100 is stored in the receiving buffer 2161. The server application program designates the buffer 2162 in which the transmitting data is stored and issues a send command 2117. This command is transferred to the send process 2317 and the data is transmitted to the client application program 1100. Next, the server application program 2100 issues a close command 2118. This command is transferred to the close process 2318 of the socket program, canceling the assignment of sockets 2340 and 2341 for the server application program.

FIG. 1 is a block diagram showing the structure of a communication system in relation to the first embodiment of the present invention. Numerals 1000, 2000, 3000, 4000 respectively designate personal computers connected by way of the communication medium 10. Within the personal computer 1000, an application program 1100, a compression/encryption module 1200 and a socket interface program (socket program) 1300 are provided. Similarly, within the personal computer 2000, an application program 2100, a compression/encryption module 2200 and a socket program 2300 are provided. A function command 1115 issued for the socket program 1300 is hooked and is then transferred to a hooking function 1215 of the compression/encryption module 1200 and compressed/encrypted in the application program 1100. In the hooking function 1215, the function 1315 of the socket program is commanded to execute actual socket process. Moreover, the function command 1325 issued for the application program 1100 is hooked in the socket program 1300, and this command is then transferred to the hooking function 1225 of the compression/encryption module 1200 for execution of the compressing/encrypting process. In the hooking function 1225, the function 1125 of the application function is commanded. Similar controls are also performed in the other personal computer.

Figure 3:
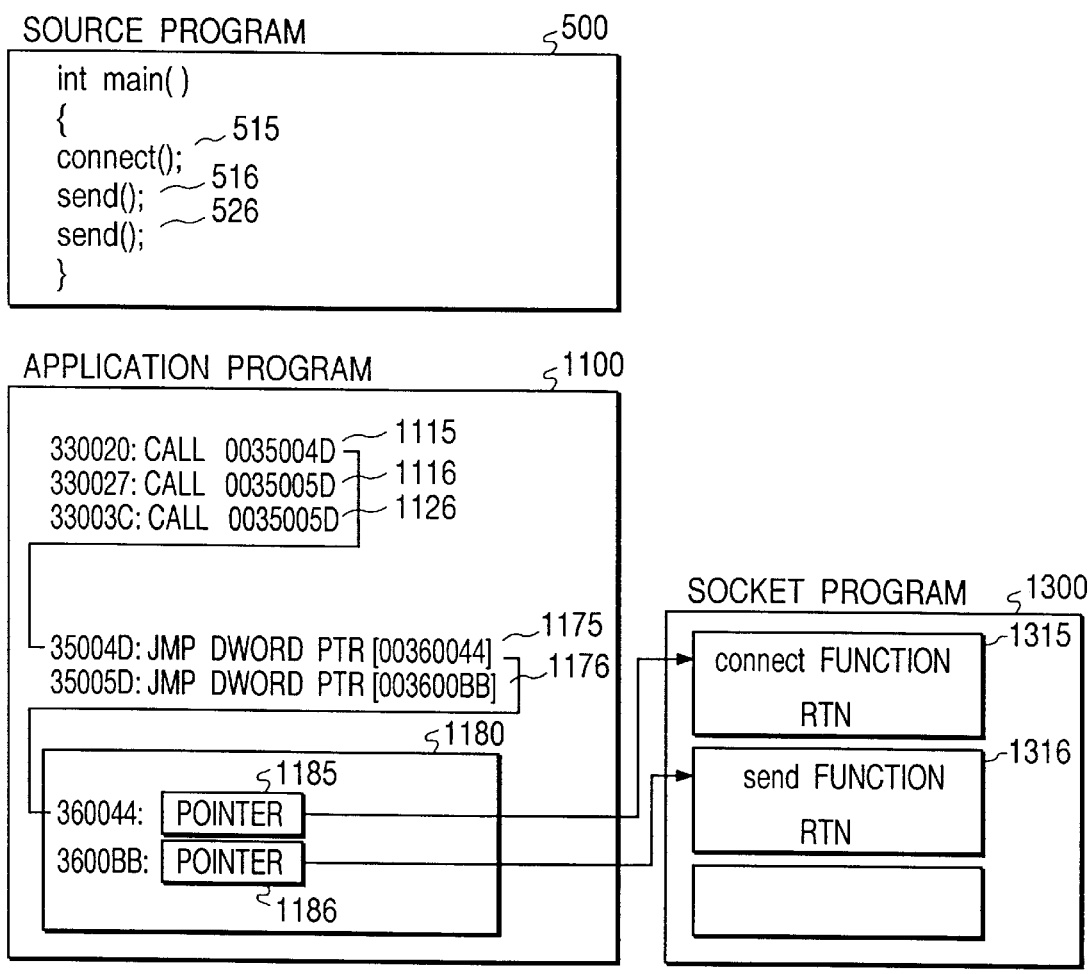
FIG. 3 is a diagram showing a calling operation from an application program in a case where the hooking process is not performed.
Figure 4:
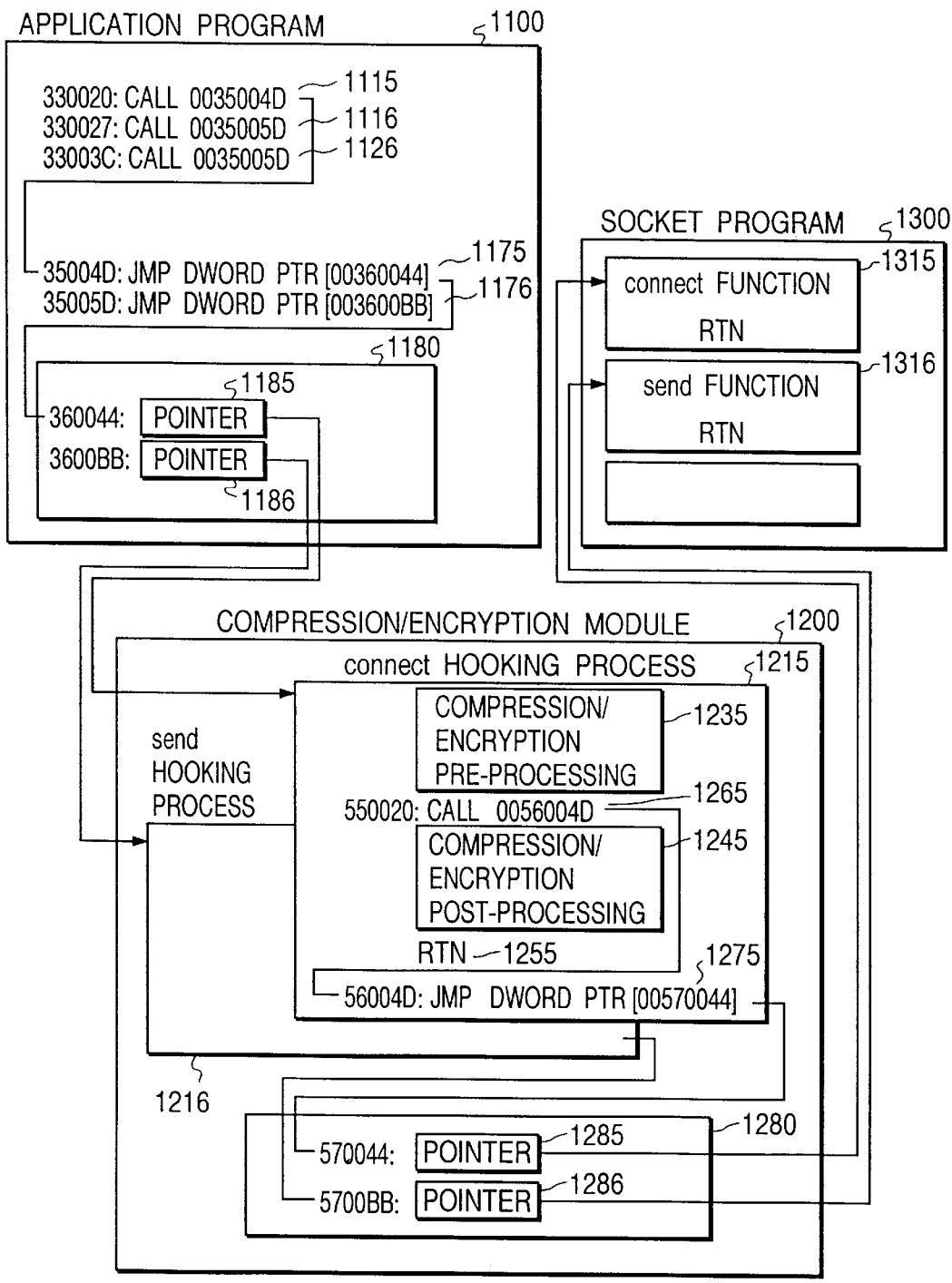
FIG. 4 is a diagram showing a calling operation from an application program in a case where the hooking process is performed.

Next, details of the hooking process will be explained with reference to FIG. 3 to FIG. 6. In this example, Windows NT, which is an operating system for a personal computer, is considered. FIG. 3 and FIG. 4 correspond to the case where the application program commands the socket function, while FIG. 5 and FIG. 6 correspond to the case where the socket program commands the application program.

FIG. 3 shows flow of control for calling the socket function from the application program when the hooking process is not carried out. The source program using the C language issues the connect ( ) command 515 and send ( ) commands 516, 526 of the socket function. With compilation of these commands, the executable module changes like the application program 1100. Namely, the connect command 515 of the socket changes to the CALL instruction 1115 of the assembly language. This command instruction does not directly call the connect function 1315 of the socket program, but calls the JMP instruction 1175 provided in another location of the application program 1100. This JMP instruction is an indirect jump instruction to jump to the address designated by a pointer 1185 stored in DWORD in the jump table 1180. This address is the connect process function of the target socket program. Subsequently, in the same manner, two send commands 516, 526 respectively change to the CALL instructions 1116 and 1126 and these instructions respectively call one JMP instruction 1176. This JMP instruction 1176 jumps to the send process function 1316 designated by the pointer 1186 in the jump table 1180. Thereby, control can be transferred to the desired process before the control is transferred to the socket program simply by rewriting the pointer in the jump table.

FIG. 4 shows the flow of control for calling the socket function from the application program in the case where a hooking process is executed. The pointer 1185 of the jump table 1180 indicates the connect hooking process 1215 of the compression/encryption module 1200. Moreover, the pointer 1186 indicates the send hooking process 1216. An example of the connect hooking process will be explained in detail. The connect hooking process will first execute the compressing/encrypting process 1235 and then issue the CALL instruction 1265 for the connect process function 1315 of the socket program 1300. This command instruction calls the JMP instruction 1275. The JMP instruction 1275 jumps to the connect process function 1315 designated by the pointer 1285 in the jump table 1280. Upon completion of the process of the connect process function, the control returns to the connect hooking process, followed by the compression/encryption post-process 1245. Next, upon execution of the RTN instruction 1255, the control returns under the CALL instruction 1115 of the application program 1100.

Figure 5:
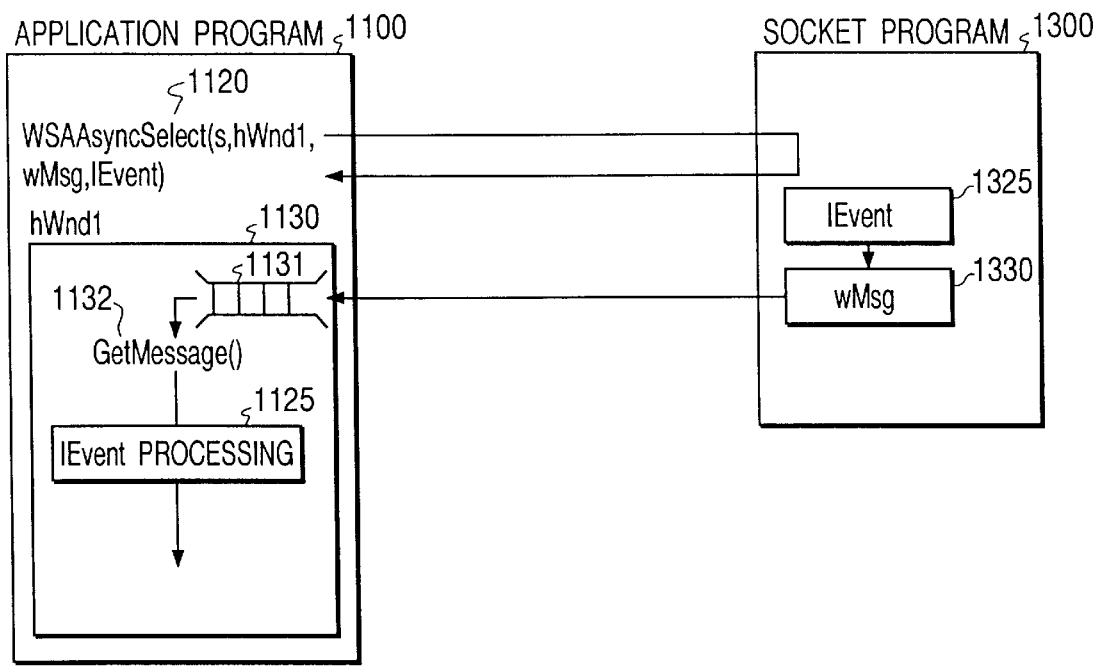
FIG. 5 is a diagram showing a calling operation from a socket program in a case where the hooking process is not performed.

FIG. 5 shows the flow of control for calling the application program 1100 from the socket program 1300 in the case where the hooking process is not executed. The application program registers the name hWnd1 of the window program 1130 for notification of an event to the socket program 1300 using the WSAAsyncSelect command 1120. To the WSAAsyncSelect command, the socket No.s, name wMsg of the message to be notified and kind lEvent of the event to be notified are also designated. When the event lEvent 1325 designated by the socket program 1300 is generated, the socket program queues a message wMsg 1330 to the message queue 1131 incorporated in the window program 1130 of the application program 1100. The window program 1130 gets a message wMsg 1330 from the message queues 1131 using the GetMessage command 1132 and detects the event lEvent 1325 generated therein to execute the process 1125 corresponding to the lEvent process.

Figure 6:
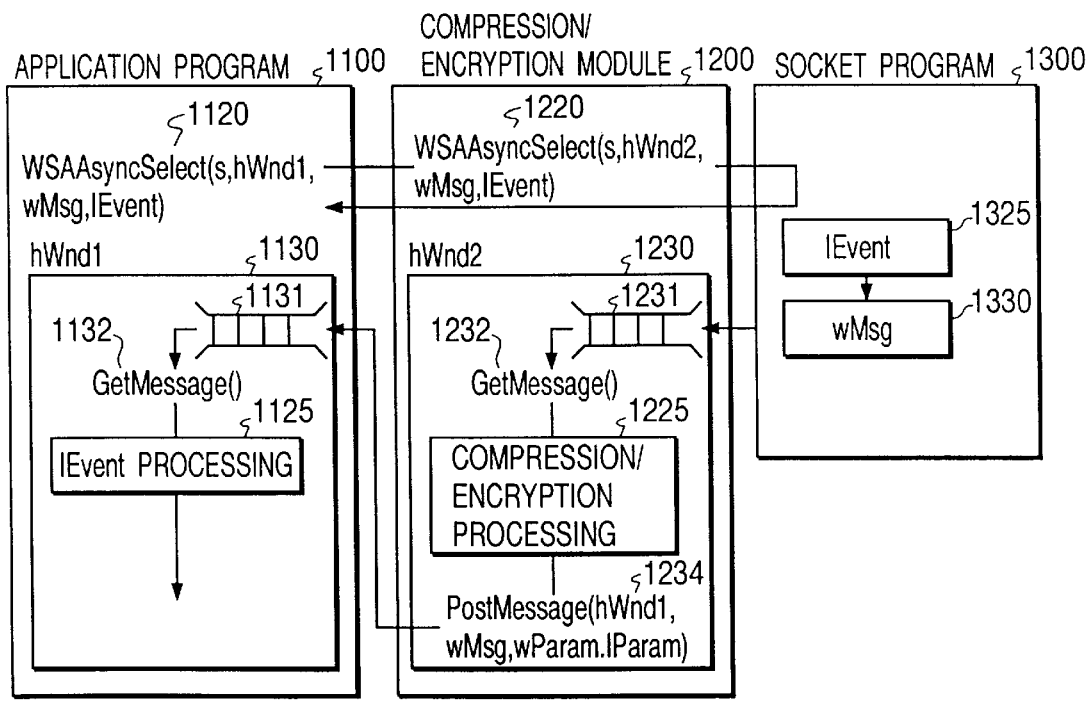
FIG. 6 is a diagram showing a calling operation from a socket program in a case where the hooking process is performed.

FIG. 6 shows the flow of control for calling the application program 1100 from the socket program 1300 in the case where a hooking process is executed. The compressing/encrypting module 1200 hooks the WSAAsyncSelect command 1120 issued by the application program 1100 and changes the name hWnd1 of the window program 1130 of the argument to the name hWnd 2 of the window program 1230 in the compressing/encrypting module to register it into the socket program 1300.

Next, when the designated event lEvent 1325 is generated in the socket program, this socket program queues the message wMsg 1330 to the message queue 1231 incorporated in the window program 1230 of the compressing/encrypting module. The window program 1230 gets the message wMsg 1330 from the message queue 1231 using the GetMessage command 1232 and detects the event lEvent 1325 generated therein to execute the compressing/encrypting process 1225 corresponding to the lEvent. Next, the window program 1230 queues the message wMsg 1330 to the message queue 1131 incorporated in the window program 1130 of the application program 1100 using the PostMessage command 1234. The window program 1130 gets the message wMsg 1330 from the message queue 1131 using the GetMessage command 1132 and detects the event lEvent 1325 generated therein to execute the process 1125 corresponding to the lEvent.

Figure 7:
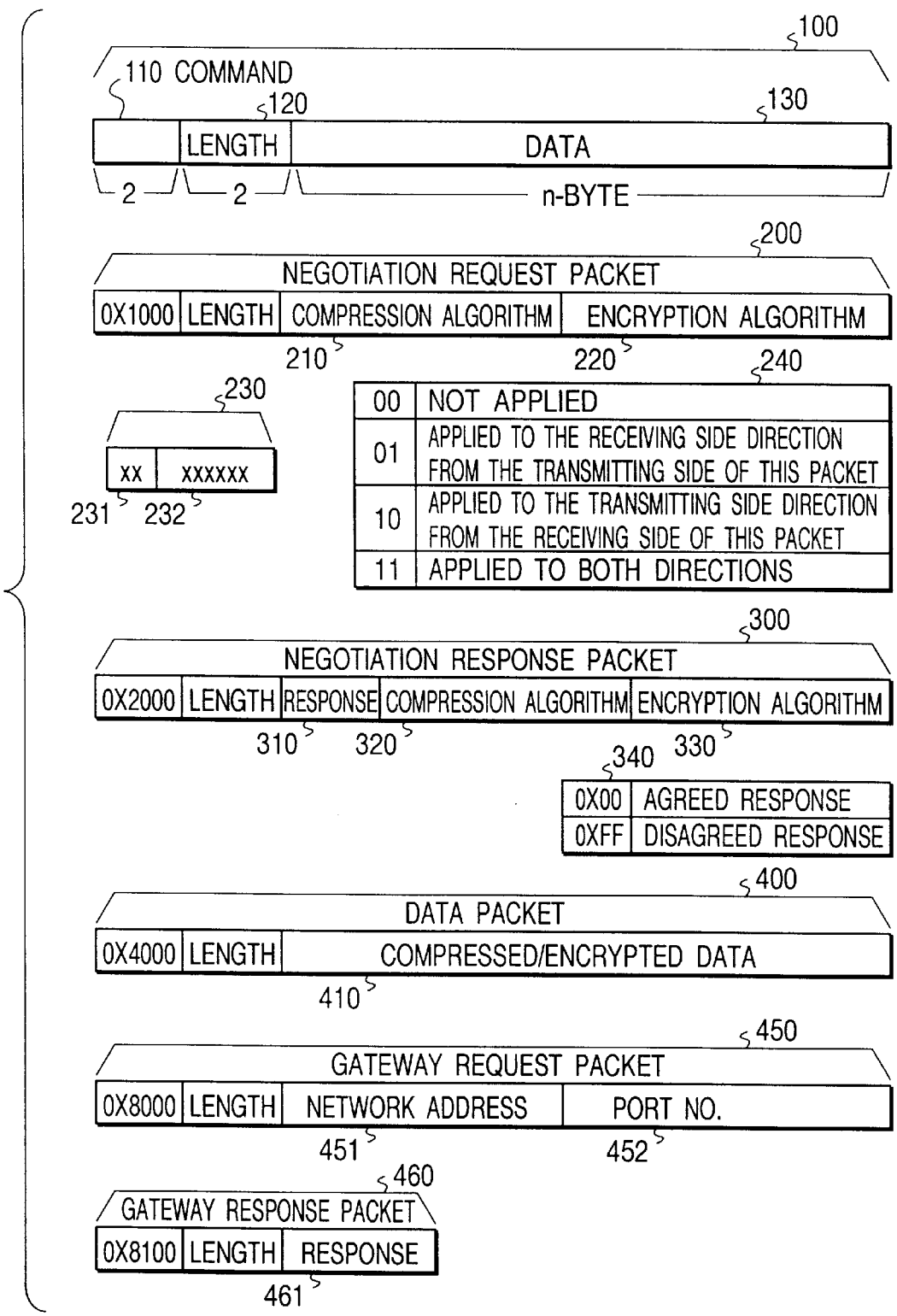
FIG. 7 is a diagram showing a format of the data used in the first, second and third embodiments.

FIG. 7 shows a data format 100 of data exchanged between the compressing/encrypting modules of the two personal computers. A command 110 in each packet indicates the type of frame, such as a negotiation request packet 200, negotiation response packet 300, data packet 400, gateway request packet 450 and gateway response packet 460. Length 120 in each packet indicates the length of data 130 in units of a byte.

The data area of the negotiation request packet 200 is composed of two fields including the compression algorithm field 210 and the encryption algorithm field 220. The format of each field is shown as 230, wherein a direction identifier 231 is formed of two bits to designate the direction to apply the algorithm, the meaning of the bits being shown in the table 240. A numeral 00 indicates that compression or encryption is not performed. A numeral 01 indicates that compression or encryption is performed for the data to be transmitted to the receiving side from the transmitting side of this packet. Numeral 10 indicates that compression or encryption is performed for the data transmitted in the inverse direction. Numeral 11 indicates that compression or encryption is performed in both directions. The algorithm field 232 designates, with a code, a class of algorithm of compression or encryption desired from the negotiation requesting side. These settings are made previously by an application program user in the format definition table of the compressing/encrypting module.

The data area of the negotiation response packet 300 is composed of a response field 310, a compression algorithm field 320 and an encryption algorithm field 330. In the response field 310, a response to the negotiation request is set. Table 340 shows the content of a response. A numeral 0X00 indicates an agreed response, while 0XFF, indicates a disagreed response. When the negotiation request accepting side agrees with the content designated by the request packet, the agreed response is set, while a disagreed response is set when the content is not agreed. Agreement or disagreement is determined depending on provision of the compression or encryption algorithm designated at the receiving side or depending on the setting of the format definition of the compressing/encrypting module.

The data area of the gateway request packet 450 is composed of a network address field 451 and a port number field 452.

The data area of the gateway response packet 460 is composed of a response field 461 having the same content as the table 340.

Next, contents of the compression/encryption process will be explained with reference to the sequence chart of FIG. 8.

FIG. 8 shows an example of transmitting data of the application program with a single transmitting operation. The application program 1100 transmits the data 500 of n-byte length using the send command 6111. The compressing/encrypting module 1200 hooks the send command, data is compressed/encrypted by the compression/encryption process 6210, a header 501 is added to form the frame 502 of m-byte length and this frame is then transmitted to the socket program 1300 using the send command 6211. When the return 6212 of the m-byte transmission from the socket program appears, the compressing/encrypting module feeds back the return 6112 of n-type transmission to the application program.

FIG. 9 shows an example of transmission in which the compressing/encrypting module transmits the data of application program in two or more stages of transmission. The application program 1100 transmits the data 510 of n-byte length using the send command 6121. The compressing/encrypting module 1200 hooks the recv command and the compression/encryption process 6220 compresses/encrypts the data. In this case, if the length of the compressed/encrypted data with addition of a header exceeds the upper limit value of the frame length, for example, m-byte, the frame 511 is formed in m-byte through compression/encryption and it is then transmitted to the socket program 1300 using the send command 6221.

When the return 6222 of m-byte transmission comes back from the socket program, the compressing/encrypting module checks to see whether all data of the application program has been transmitted on the basis of the discrimination process 6223. When all data already has been transmitted, the return 6122 of n-byte transmission is fed back to the application program. If all data has not yet been transmitted, the operation jumps to the compression/encryption process 6220 to form the next frame 512.

Figure 10:
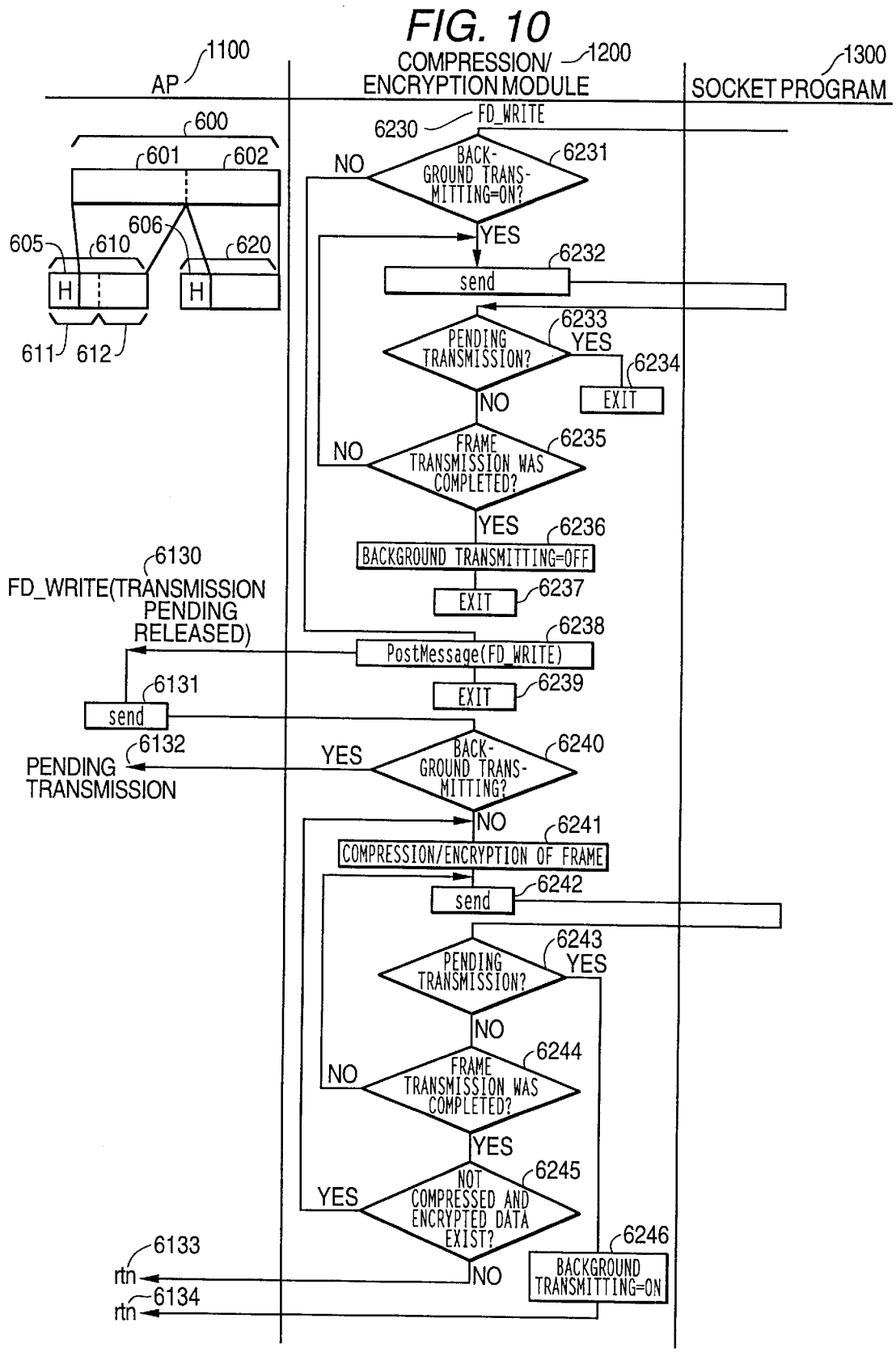
FIG. 10 is a flow diagram showing an example of divided transmission of data in the first embodiment.

FIG. 10 shows a practical example of divided transmission of a frame. This figure shows transmission of data of the application program 1100, while operation of the application program is not synchronized with the operation of the compressing/encrypting module 1200. Moreover, the compressing/encrypting module manages therein flags indicating background transmission. The background transmission means that the return indicating completion of transmission is fed back to the application program under the condition that the compressing/encrypting module has not yet transmitted all data received from the application program and thereafter the compressing/encrypting module transmits the remaining data.

Operations will be explained sequentially. Upon completion of setting of the connection, the FD_WRITE message 6230 indicating possibility of transmission is transferred to the compressing/encrypting module from the socket program 1300. Next, the compressing/encrypting module checks to see whether the background transmission is being continued or not by the discrimination process 6231. At the beginning, since background transmission is not being conducted, the FD_WRITE message 6130 is transmitted to the application program with the PstMessage command 6238 to indicate the possibility of transmission and then executes the EXIT process 6239.

The application program which has received the FD_WRITE message transmits the data 600 using the send command 6131. The compressing/encrypting module hooks the send command and checks to see whether the background transmission is being continued or not on the basis of the discrimination process 6240. Since the background transmission is not yet conducted, the frame compression/encryption processor 6241 compresses/encrypts data 601 and adds the header 605 to the data to form the frame 610 and then sends the data to the socket program with the send command 6242. Here, if the background transmission is being conducted, the return 6132 waiting for the transmission is fed back to the application program.

The send command feeds back a normal return when the socket program transmits the data for one byte or more. If the send command cannot return even one byte, it feeds back a return message for transmission waiting. Upon completion of the send command 6242, the discrimination process 6243 checks the return to see whether it is normal or not. For a normal return, the discrimination process 6244 checks whether all data of the frame 610 have been transmitted or not. When only a part 611 of the frame has been transmitted, the send command 6242 is executed again to transmit the remaining part 612 of frame.

When the second execution of the send command 6242 is completed and transmission of frame 610 as a whole is checked by the discrimination process 6244, the discrimination process 6245 checks to see whether there is uncompressed/unencrypted data or not. Since the data 602 of the application program is still left, the frame compression/encryption processor 6241 compresses/encrypts such data and generates the frame 620 with the addition of the header 606 and then transmits the frame with the send command 6242.

An example of starting the background process will be explained. When the second command is completed three times and the discrimination process 6243 discriminates the transmission waiting condition, a flag indicating transmission of background is set to ON in the process 6246 and the return 6134 is fed back to the application program because transmission has been performed up to the frame 620, namely for all data 600. At this time, the compressing/encrypting module starts the background process to execute a transmission of the frame 620.

When the background process starts, the compressing/encrypting module waits for a transmission allowing FD_WRITE message from the socket program. Upon reception of the FD_WRITE message 6230, the compressing/encrypting module discriminates transmission of background on the basis of the discrimination process 6231 and transmits the frame 620 with the send command 6232.

Upon completion of the send command, the discrimination process 6233 checks to see whether the socket program is waiting for a transmission or not. When the socket program is waiting for a transmission, the discrimination process 6233 executes EXIT 6234, and waits for reception of the FD_WRITE message from the next socket program. When the socket program is not waiting for a transmission, the discrimination process 6235 checks to see whether all frames have been transmitted. If some frames have not yet been transmitted, the send command 6232 is executed again to transmit the remaining data. When all frames have been transmitted, only the EXIT 6237 is executed to complete the background transmission.

Figure 11:
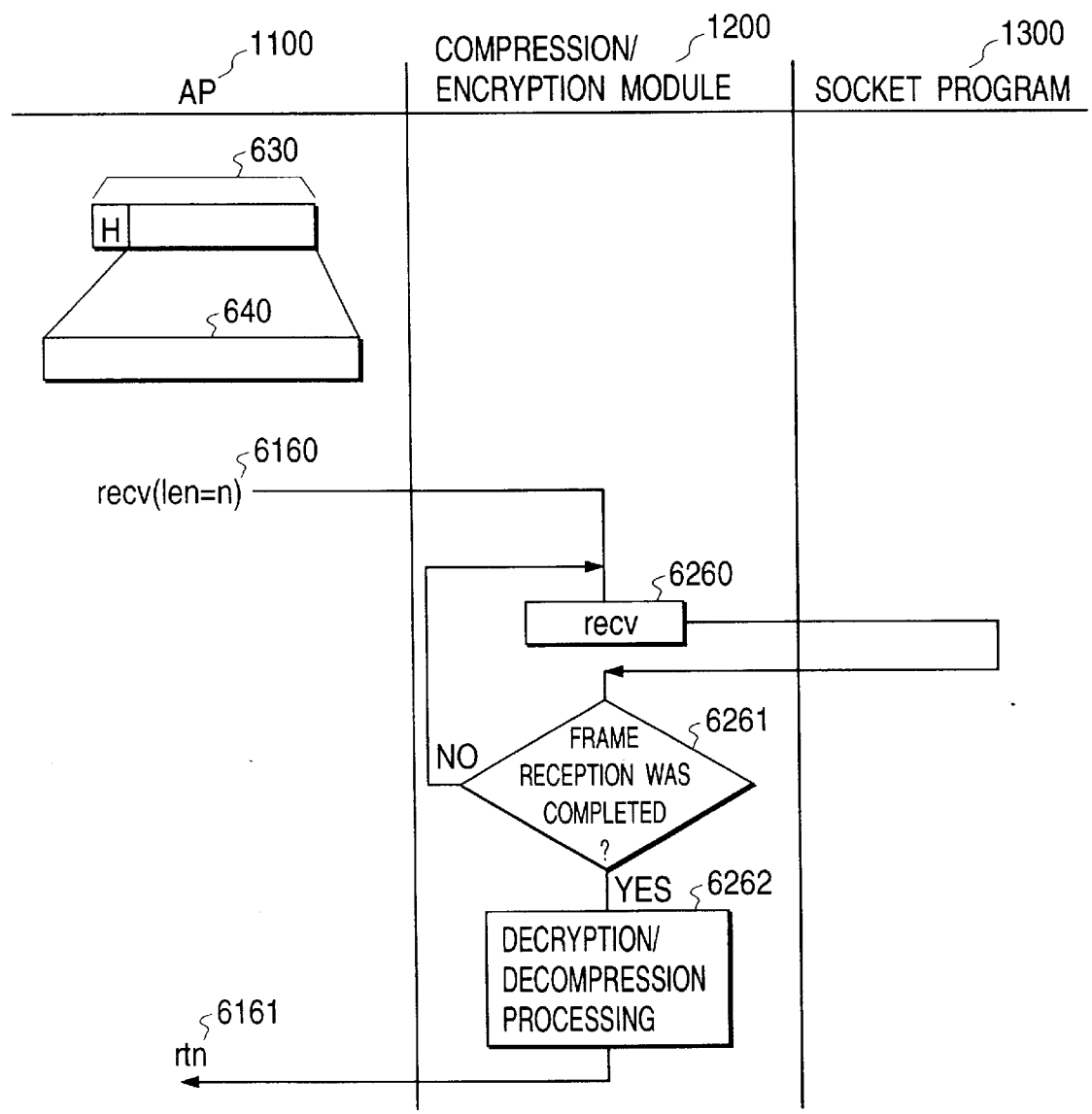
FIG. 11 is a flow diagram showing an example of data reception in the first embodiment.

FIG. 11 shows an example where the application program receives frame data only with single receiving operation. The application program 1100 issues a reception request to the socket program 1300 using the recv command 6160. The compressing/encrypting module 1200 hooks the recv command 6160 and issues by itself the recv command 6260 to the socket program 1300 in place of the application program. When the recv command is returned from the socket program, the discrimination process 6261 checks to see whether the frame 630 as a whole has been received or not. When the entire part of the frame 630 is received, the decrypting/decompressing process 6262 is performed to generate data 640, and it is then fed back to the application program by the return 6161. When the frame is received up to an intermediate part, the recv command 6260 is issued to the socket program.

Figure 12:
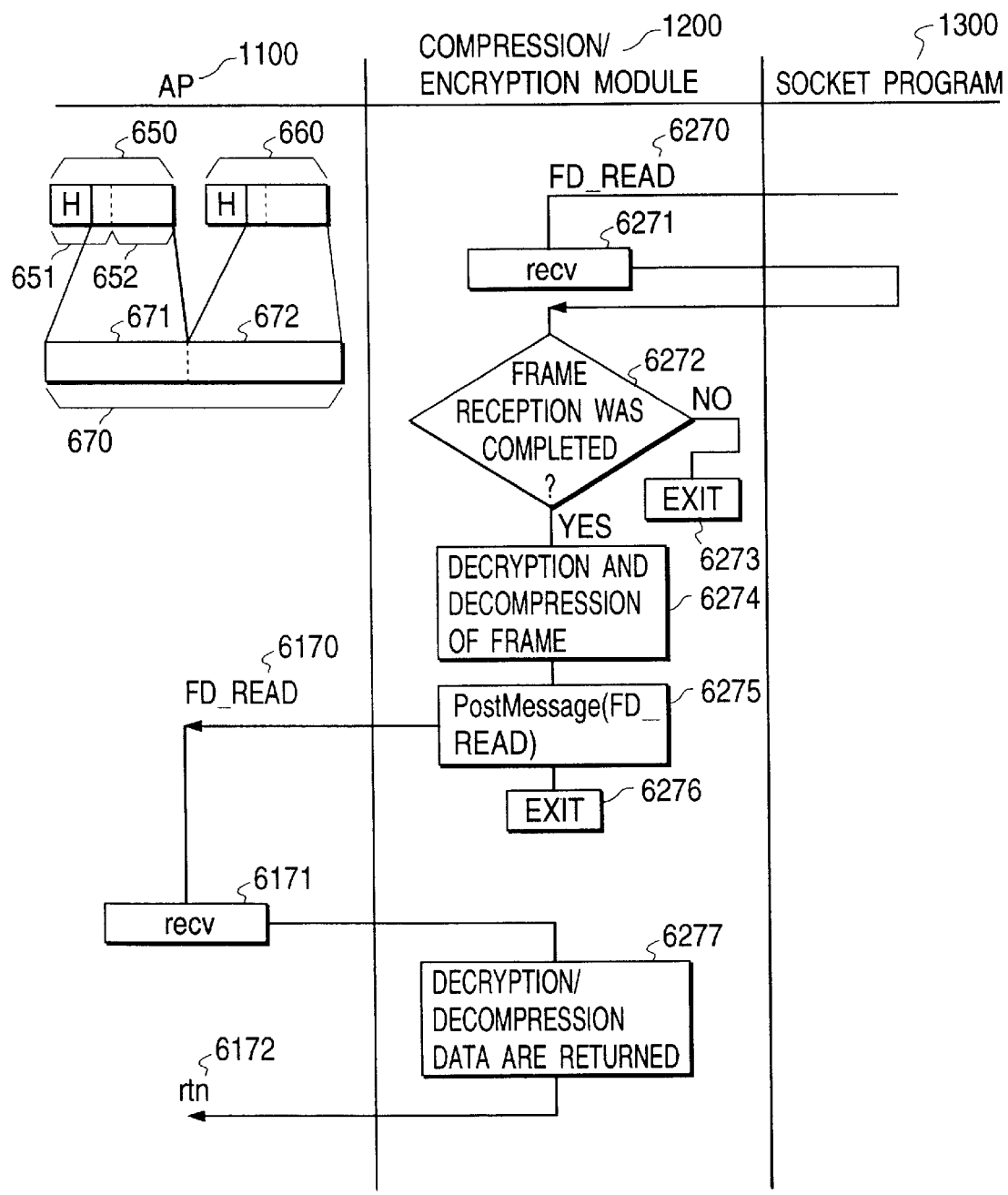
FIG. 12 is a flow diagram showing an example of divided reception of data in the first embodiment.

FIG. 12 shows a practical example of the divided reception of the frame. This figure shows the reception of data from the network under the condition that the operation of application program 1100 is not synchronized with the operation of compressing/encrypting module 1200.

The subsequent operations will be explained sequentially. Upon completion of setting of connections and reception of the frame 650 from the other personal computer, the FD_READ message 6270 indicating the possibility for reception is returned to the compressing/encrypting module from the socket program 1300. The compressing/encrypting module receives the frame 650 with the recv command 6271. When the recv command is returned, the discrimination process 6272 checks to see whether reception of a frame has been completed or not. If only a part 651 of the frame 650 is received, the discrimination process executes the EXIT 6273 and waits for the next FD_READ message to receive the remaining frame data 652.

When reception of the frame is completed, a decryption/decompression process 6274 on the frame is performed and the FD_READ message 6170 is transferred to the application program using the PostMessage command 6275 for the EXIT. In the same manner, when the next frame 660 arrives, the compressing/encrypting module decrypts/decompresses such frame to generate the data 672.

The application program 1100, having received the FD_READ message, issues the recv command 6171 to the socket program 1300. The compressing/encrypting module hooks the recv command and transfers the decrypted/decompressed data 671 and 672 to the application program with the return operation 6171.

In this embodiment, the execution sequence of compression and encryption operations is not designated particularly, but it is possible to enhance the compression effect in that the compression process is performed before execution of the encryption process.

According to the present embodiment, when the application program issues only the data transmission or reception command to the socket program as in the case of the related art, the compressing/encrypting module discriminates such command and data can be transferred safely at a high speed between personal computers without modification of the application program for data compression or data encryption or both operations thereof.

Moreover, according to this embodiment, even if the compressing/encrypting data is transmitted up to an intermediate part due to failure or congestion of traffic on the transmission line, since the compression/encryption process is performed in a unit of a frame and the frame is guaranteed to be transmitted completely by the compressing/encrypting module, it is never possible for the conversion tables for compression/encryption to be mismatched on the transmitting side and receiving side to cause data compression/encryption to be disabled.

(EMBODIMENT 2)

Figure 13:
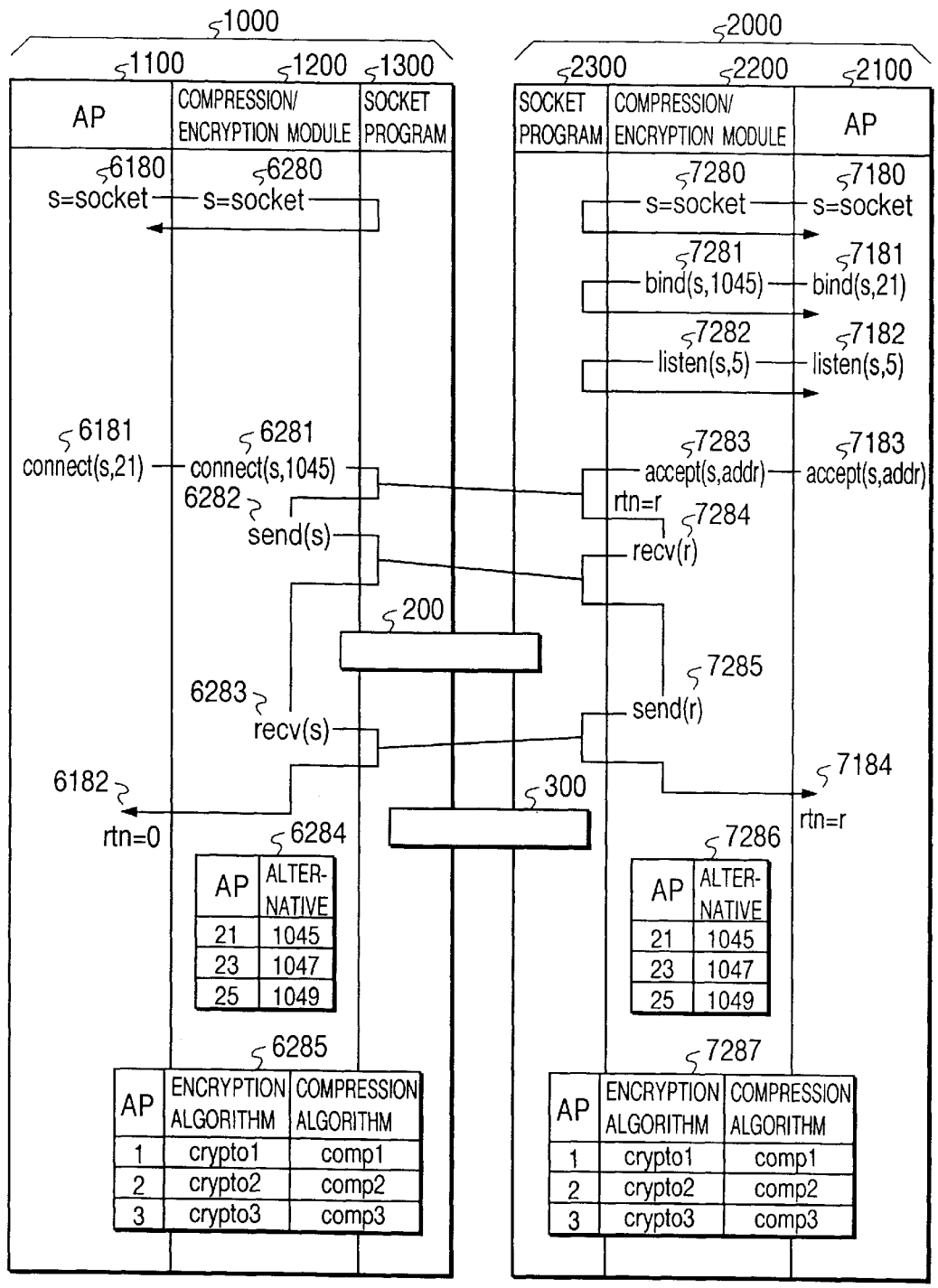
FIG. 13 is a diagram showing an example of connection setting in the second embodiment.

FIG. 13 shows a method of setting the connections for the compressed/encrypted data communication between a client PC and a server PC. When the application program 1100 of the client PC 1000 issues the socket command 6180, the compressing/encrypting module 1200 hooks this socket command 6180, issues the socket command 6280 to the socket program 1300 and transfers the received socket number to the application program.

When the application program 2100 of the server PC also issues the socket command 7180, the compressing/encrypting module 2200 hooks this socket command 7180, issues the socket command 7280 of the same content to the socket program 2300 and transfers the received socket number to the application program.

Next, the application program 2100 issues the bind command 7181 designating the connection acceptance port number 21. The compressing/encrypting module 2200 hooks the bind command, changes the table port number to 1045 from 21 and issues the bind command 7281 to the socket program 2300. Correspondence between these numbers is previously determined for the kind of principal server application program and is then stored in the table 7286.

Next, the application program 2100 issues the listen command 7182. The compressing/encrypting module hooks the listen command and transfers the listen command 7282 of the same content to the socket program.

Thereafter, the application program 2100 issues the accept command 7183. The compressing/encrypting module hooks the accept command, transfers the accept command 7283 of the same content to the socket program to wait for connection request from the client PC.

The application program 1100 of the client PC 1000 designates the address and port number 21 of a partner server PC to issue the connect command 6181 in order to issue the connection request to the server PC. The compressing/encrypting module 1200 hooks the connect command 6181, changes the port number to 1045 from 21 and issues the connect command 6281 to the socket program 1300. Correspondence between these numbers is previously determined for the kind of principal server application program and is then stored in the table 6284.

Upon reception of returning of the connection end from the socket program, the compressing/encrypting module 1200 sets, without immediately indicating the completion of the connection to the application program 1100, a type of algorithm for compression and encryption used by the client PC in the negotiation request packet 200 from the format definition table 6285 and then sends such type of algorithm using the send command 6282. Only when the agreed negotiation response packet 300 is received from the server with the next recv command 6283 will the compressing/encrypting module feed the return 6182 for establishment of a connection to the application program. When the negotiation response packet is not received, or a disagreed response is issued even when such negotiation response packet is received, an indication of non-establishment of a connection is returned to the application program.

In regard to a type of algorithm of compression and encryption designated in the negotiation request packet 200, a user of the application program 1100 is capable of previously setting a desired value for each application program in the format definition table 6285.

The compressing/encrypting module 2200 of the server PC 2000 accepts a connection request from the client PC, when it is issued, then issues the recv command 7284 and receives the negotiation request packet 200 from the client PC. When the compression and encryption algorithms designated in the received negotiation request packet 200 are the same as those stored in the format definition table 7287, the negotiation response packet 300 indicating an agreed response is transmitted to the client PC with the send command 7285 and the return 7184 for completion of connection acceptance is sent to the application program 2100. If such algorithms are different, the negotiation response packet indicating a disagreed response is transmitted to the client and a return for completion of connection is not sent to the application program.

When the compressing/encrypting module is not loaded to the application program in this second embodiment, the bind command 7181 is directly transferred to the socket program 2300. In this case, since the connect command 6281 of the client PC designates the partner port number 1045 to issue the connection setting request even if the server PC designates the port number 21, a connector error is generated. In this case, the following two methods are introduced. In one method, an error of the connect command 6281 is returned directly to the application program 1100. In the other method, when the compressing/encrypting module 1200 displays a message for inquiring whether or not to set the connection to users and an application program user issues an agreed response, the partner port number 21 is designated to issue the connect command 6281 and to set the connection with the server PC and its return is sent to the application program 1100 to execute the existing communication without compression/encryption.

According to this embodiment, since the compressing/encrypting modules of the client PC and server PC use a port number different from that designated by the application program for the compressed/encrypted communication, such communication can be realized when both client PC and server PC have the compression/encryption function of this embodiment, and, if a distant party does not have the encryption function, communication still can be realized without compression/encryption on the basis of the judgment of the user.

Moreover, when the operating system of the server PC has a multitask function, an existing client application program having no compression/encryption function can realize communication with a server application program having no compression/encryption function, while a client application program having a compression/encryption function can realize communication with a server application program having a compression/encryption function by simultaneously operating the process having the compression/encryption function and that having no such function within the server PC.

In addition, since connection is provided only when the same compression and encryption algorithms are provided in both client and server PCs by means of negotiation, the compressed/encrypted data which cannot be decrypted/decompressed on the receiving side is never transmitted, assuring higher security of transmission.

(EMBODIMENT 3)

Figure 14:
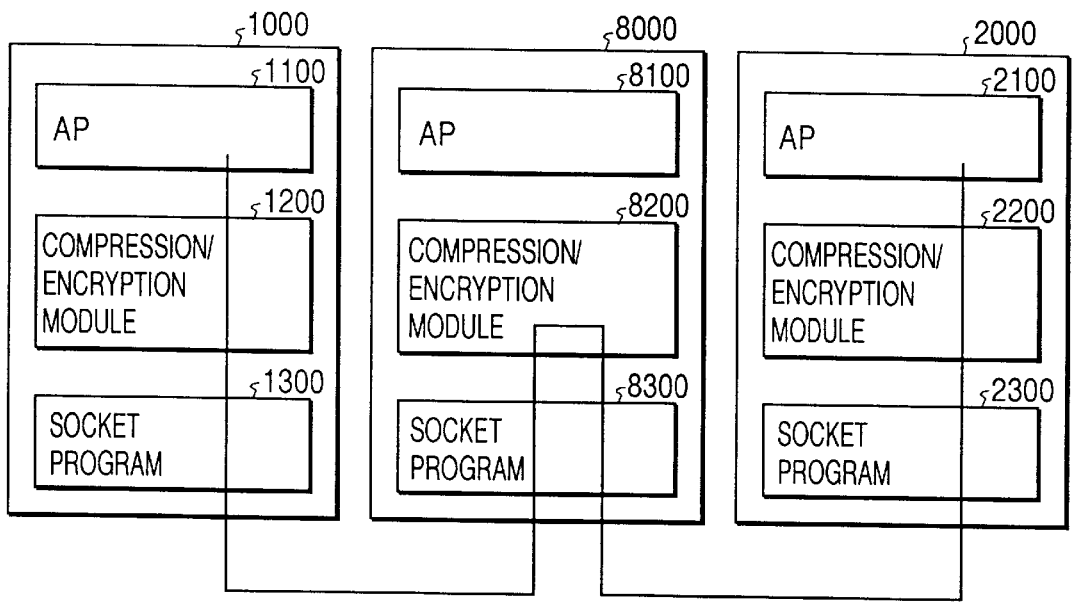
FIG. 14 is a block diagram showing an overall structure of a communication system representing a third embodiment of the present invention.

FIG. 14 shows a structure for effecting compressed/encrypted data communication between a client PC 1000 and server PC 2000 via a gateway 8000. The compressing/encrypting module 1200 of the client PC 1000 transmits, after compressing/encrypting the data received from the application program 1100, the packet to the gateway 8000. The compressing/encrypting module 8200 of the gateway 8000 receives the packet and then transmits this packet to the server PC 2000 in the form of compressed/encrypted data in place of the application. The compressing/encrypting module 2200 of the server PC 2000 receives the packet and transfers it to the application program 2100 after decryption/decompression.

Figure 15:
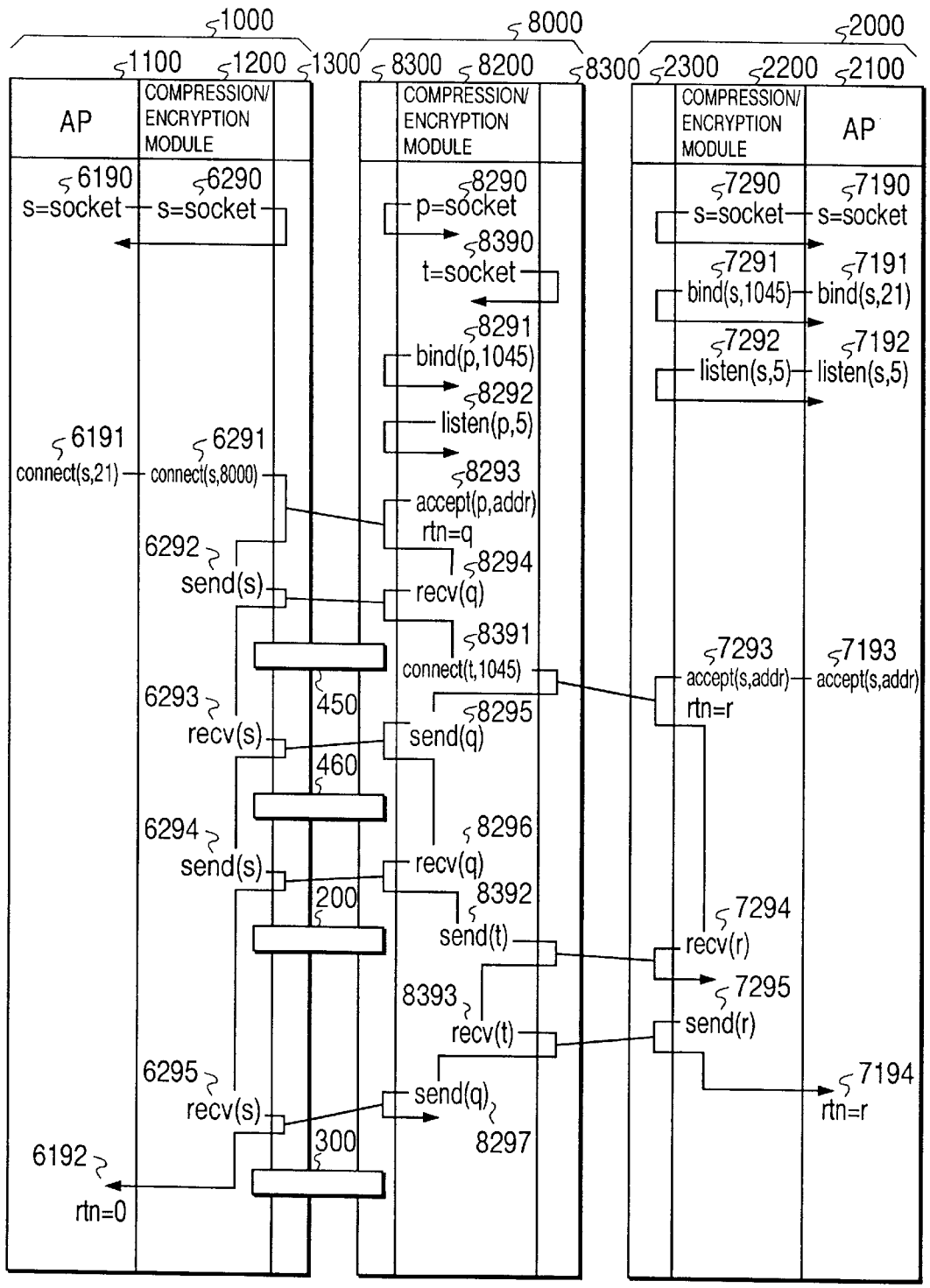
FIG. 15 is a diagram showing an example of the connection setting in the third embodiment.

FIG. 15 shows a method of establishing a connection for compression/encryption between the client PC and server PC via the gateway.

When the application program 1100 of the client PC 1000 issues the socket command 6190, the compressing/encrypting module 1200 hooks this command, issues the socket command 6290 to the socket program 1300 and transfers the socket number received to the application program.

When the application program 2100 of the server PC 2000 issues the socket command 7190 in the same manner, the compressing/encrypting module 2200 hooks it, issues the socket command 7290 of the same content to the socket program 2300 and transfers the socket number received to the application program. Next, the application program 2100 issues the bind command 7191 having designated the connection acceptance port number 21. The compressing/encrypting module 2200 hooks the bind command, changes the port number to 1045 from 21 and issues the bind command 7291 to the socket program 2300. Next, the application program 2100 issues the listen command 7192. The compressing/encrypting module hooks the listen command and transfers the listen command 7292 of the same content to the socket program. Thereafter, the application program 2100 issues the accept command 7193. The compressing/encrypting module hooks the accept command, transfers the accept command 7293 of the same content to the socket program and waits for connection request from the gateway.

The compressing/encrypting module 8200 of the gateway 8000 transfers the socket command 8290 to the socket program 8300. Next, a particular port in the gateway, for example, number 8000 is designated as the port number and the bind command 8291 is issued to the socket program 8300. Next, the listen command 8292 is issued to the socket program. Thereafter, the compressing/encrypting module issues the accept command 8293 to the socket program to waits for the connection request from the client PC.

The application program 1100 of the client PC designates the address and port number 21 of the server PC to issue the connect command 6191 in order to request connection to the server PC. The compressing/encrypting module 1200 hooks the connect command 6191 to change the port number 21 to 1045. Then, the module 1200 sets the address and port number 1045 of the server PC to the data area of the gateway request packet 450. Thereafter, module 1200 designates the address and port number, for example, 8000 to issue the connect command 6291 to the socket program 1300.

Upon reception of the return indicting completion of connection from the socket program 1300, the compressing/encrypting module 1200 sends the gateway request packet 450 to the gateway using the send command 6292. With the next recv command 6293, the module 1200 receives the gateway response packet 460 from the gateway. When it is an agreed response, the compressing/encrypting module 1200 transmits the negotiation request packet 200 using the send command 6294. When the negotiation is set up by receiving the agreed negotiation response packet 300 from the server with the next recv command 6295, the compressing/encrypting module sends the return 6192 indicating establishment of a connection to the application program. If the gateway response packet is not received, or if the packet received is a disagreed response, a return indicating no-establishment of connection is sent to the application program. If the negotiation response packet is not received, or if the packet received is a disagreed response, a return indicating no-establishment of connection is also sent to the application program.

When the client PC issues a connection request, the compressing/encrypting module 8200 of the gateway 8000 accepts this request and issues the recv command 8294 to receive the gateway request packet 450 from the client PC. Next, the module 8200 issues the socket command 8390 to the socket program 8300 to acquire the new socket number and designates the address of the server PC and the port number 21 being set to the gateway request packet 450.

Upon reception of the return indicating completion of connection from the socket program 8300, the compressing/encrypting module 8200 sends the gateway response packet 460 to the client PC using the send command 8295. When the module 8200 receives the negotiation request packet 200 from the client PC with the next recv command 8296, it sends such negotiation request packet 200 to the server PC 2000 using the send command 8392. Next, the module 8200 receives the negotiation response command 300 using the recv command 8393 and transmits this command to the client PC 1000 using the send command 8297.

The compressing/encrypting module 2200 of the server PC receives the connection request from the gateway as the return of the accept command 7293, it issues next the recv command 7294 to receive the negotiation request packet 200 transferred from the gateway. When the negotiation request received is an agreed response, the module 2200 sends the negotiation response packet 300 indicating an agreed response to the client PC with the send command 7295 to send the return 7194 indicating completion of connection acceptance to the application program 2100. If this return is a disagreed response, the negotiation response packet indicating a disagreed response is sent to the gateway and no return is sent to the application program.

In this embodiment, connection is set up between the gateway and server PC without any condition for the connection request to the gateway from the client PC, but it is also possible to prepare the list of accessible server PCs from the client PC in the gateway, thereby to set up a connection only to the server PC is listed in this list. Moreover, it is further possible that, if the list of port numbers to be accessed by the client PC is prepared in the gateway, the connection can be set up only to a port listed in this list.

According to this embodiment, when a communication is executed by compressing/encrypting data between the client PC and server PC via the gateway, it is not required to prepare the relaying program for gateway process for each kind of application on the gateway. Moreover, since it is not required that the data received at the gateway is first transferred to the application for decryption/decompression and thereafter transmitted, transfer delay can be reduced.

In this embodiment, both compression and decryption are performed in the same example, but this embodiment can also be applied to the example where only compression or encryption is executed.

Moreover, no particular limitation is given to the algorithm for compression/encryption.

As explained above, according to the present invention, for a communication using a socket program between the application programs of the personal computers in the system where a plurality personal computers are connected with each other using communication lines, the data transmitted or received can be compressed or encrypted or compressed and encrypted without changing the coding of the application program, and thereby the safety of the data communication can also be improved.

In addition, since the algorithm used for the compression/encryption process allows selection of those which can be used between the personal computers under the communication using a negotiation at the time of setting the connection, the application factor can be improved.

Since the compression/encryption process is performed in units of a frame and a data transfer to the distant system can be guaranteed for each frame, identity of tables can be ensured on both the transmitting and receiving sides, resulting in higher safety even in the case of updating the conversion table for compression/encryption on the basis of the transfer data.

Moreover, even in a case where a gateway exists in the course of the communication, the data can be relayed automatically in the gateway, and therefore it is no longer necessary to recover the compressed/encrypted data to the initial condition, ensuring higher transfer efficiency.

Although preferred embodiments of the present invention have been described and illustrated, it will be apparent to those skilled in the art that various modifications may be made without departing from the principles of the invention.

What is claimed is:

1. A communication system comprising:
a plurality of communication lines; and
a plurality of personal computers connected to each other via said communication lines,
a personal computer of the plurality of personal computers having a communication program and an application program and said application program executes transmission and reception of data with other ones of the plurality of personal computers using commands offered by said communication program, said application program including a hooking program which discriminates a data communication command issued thereby and which compresses or encrypts data,
wherein, after said hooking program has compressed or encrypted data of said application program depending on a type of received command, said command is transferred to said communication program.

2. A communication system as set forth in claim 1, wherein said hooking program discriminates a data transmission command to which data is appended, and wherein after said hooking program has compressed data appended to said data transmission command, said data transmission command is transferred to said communication program.

3. A communication system as set forth in claim 1, wherein said hooking program discriminates a data transmission command to which data is appended, and wherein, after said hooking program has encrypted the data appended to said data transmission command, said data transmission command is transferred to the communication program.

4. A communication system as set forth in claim 1, wherein said hooking program discriminates a data transmission command to which data is appended, and wherein, after said hooking program has compressed and encrypted data appended to said data transmission command, said data transmission command is transferred to the communication program.

5. A communication system as set forth in claim 4, wherein said data is encrypted after it is compressed.

6. A communication system as set forth in claim 2 or 3 or 4 or 5, wherein said hooking program transmits data appended to a data transmission command after compression and encryption in a unit of a frame of a predetermined length and when transmission of the frame is interrupted, completion of transmission of said interrupted frame is returned as a response of said data transmission command to continuously transmit untransmitted portions of the frame.

7. A communication system as set forth in claim 1, wherein said hooking program discriminates a data reception command, and wherein, after said hooking program has received data from said communication program and decompressed the data, such data is then returned to the application program in addition to a response of said data reception command.

8. A communication system as set forth in claim 1, wherein said hooking program discriminates a data reception command, and wherein, after said hooking program has received data from said communication program and decrypted the data, said decrypted data is then returned to the application program in addition to a response of said data reception command.

9. A communication system as set forth in claim 1, wherein said hooking program discriminates a data reception command, and wherein, after said hooking program has received data from said communication program and decrypted and decompressed the data, said decrypted and decompressed data is returned to the application program in addition to a response of said data reception command.

10. A communication system as set forth in claim 1, wherein each personal computer of the plurality of personal computers has an application program and a communication program, and wherein the application program of a first personal computer of the plurality of personal computers issues a connection request command by designating a connecting end point value number of a second personal computer of the plurality of personal computers to the communication program, the application program of a second personal computer issues a connection acceptance command by designating a connecting end point number of its own personal computer to the communication program and thereafter data transmission and reception is started between the first and second personal computers, wherein said first personal computer has a first hooking program which discriminates a connection request command and designates a different connection end point number corresponding on a one to one basis to the connecting end point number designated by said command and then transfers such number to said command, the second personal computer has a second hooking program which discriminates a connection acceptance command and designates a different connecting end point number corresponding on a one to one basis to the connecting end point number designated by said command and transfers said command to the communication program.

11. A communication system as set forth in claim 10, further comprising a table storing a different value corresponding, on a one to one basis, to a connecting end point number, allowing a user of an application program to be able to set a value in the table corresponding to the connecting end point number designated by a connection request command or a connection acceptance command by reference to said table.

12. A communication system as set forth in claim 10, wherein after connection is established between the hooking programs of the first personal computer and second personal computer, the first hooking program of the first personal computer transmits an indication of a type of algorithm to compress and encrypt data to the second hooking program of the second personal computer, said second hooking program returns an agreed response to the first hooking program of the first personal computer when the type of algorithm indicated from the first hooking program of the first personal computer is matched with the type of algorithm in the second personal computer, and the first hooking program of the first personal computer returns, upon reception of the agreed response, a return code indicating completion of setting of a connection to the application.

13. A communication system as set forth in claim 12, wherein communication without any compression/encryption of data is performed only when the compression/encryption program is loaded only in one personal computer used for communication.

14. A communication system as set forth in claim 12, wherein starting of communication is confirmed to a user of an application program when a personal computer, as a distant party of communication, does not have the compression/encryption function.

15. A communication system as set forth in claim 1, wherein the system further comprises a gateway, the gateway having a hooking program which effects communication between a first personal computer and a second computer via the gateway, the address of the second personal computer and connecting end point information are transmitted to the hooking program of the gateway from the hooking program of the first personal computer after a first connection is established between the hooking program of the first personal computer and the hooking program of the gateway, said hooking program of the gateway establishes a second connection to the connecting end point of the second personal computer on the basis of such address and end point information and the communication is established between the first and second personal computers using said first and second connections.

* * * * *